Jan. 19, 1937.　　　　C. C. LAMB　　　　2,068,495
BALANCING, INDICATING, AND WEIGHING MEANS FOR ROTARY BODIES
Filed Sept. 6, 1932　　　　2 Sheets-Sheet 1

INVENTOR
CHARLES CALVERT LAMB
by Henry Beek
ATT'Y

Jan. 19, 1937.  C. C. LAMB  2,068,495
BALANCING, INDICATING, AND WEIGHING MEANS FOR ROTARY BODIES
Filed Sept. 6, 1932    2 Sheets-Sheet 2
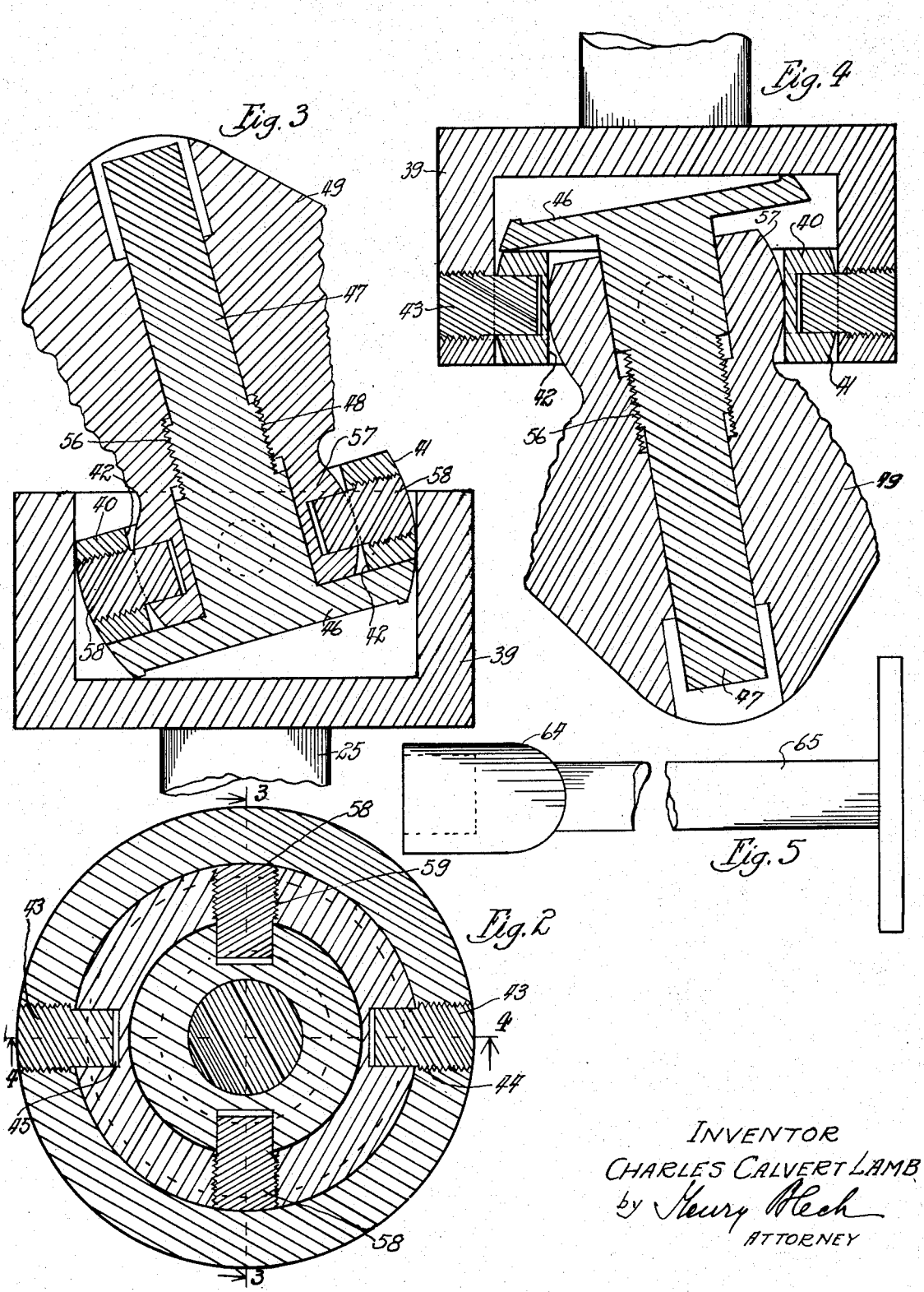
INVENTOR
CHARLES CALVERT LAMB
by Henry Hech
ATTORNEY Patented Jan. 19, 1937

2,068,495

UNITED STATES PATENT OFFICE 2,068,495

BALANCING, INDICATING, AND WEIGHING MEANS FOR ROTARY BODIES

Charles Calvert Lamb, Chicago, Ill.

Application September 6, 1932, Serial No. 631,810

7 Claims. (Cl. 210—63)

The invention relates to a balancing, indicating and weighing means for rotary bodies and is particularly concerned with centrifugal extractors where a container is placed in rapid rotation for the extraction of moisture of the type described in my Letters Patent No. 1,768,851 issued July 1st, 1930.

The extractors hitherto produced or known have the defect that either a balanced relation of the rotating member is not maintained giving rise to vibration, or that the means suggested for the elimination of vibration are unsatisfactory or inoperative or both, because a true balanced and concentric relation must be maintained at all times, if vibration is to be completely avoided.

The elimination of vibration is of vital importance in devices of the character described, because it enables rotation at any desired speed; it enables rotation of a given weight with considerable less power, dispenses with a large cumbersome machine otherwise necessary to try to compensate vibration, and dispense with the necessity of providing a solid concrete foundation and thus giving rise to the further defect that the machine is not maintained in true aplomb condition.

It therefore, constitutes the principal object of the invention to provide a device having a rotary member where vibration is completely eliminated under any and all conditions and a true balanced and concentric relation of the parts are permanently maintained.

It is a further object to provide indicating means informing the operator of the extent of the unequally distributed load at any given point of the rotating container, so as to enable the operator to rectify the unequal distribution.

A further object constitutes the provision of means for permitting tilting of the container under unequally distributed loads without causing non-concentric relation of the container and associated parts.

It is a still further object of the invention to provide means for enabling an operator to determine unequal distribution of the load in a rotary container, rectify such defect and lock the container in true balanced and concentric relation to preclude any possibility of vibration during operation.

With these and other equally important objects in view which will become apparent from a perusal of the invention, the latter comprises the means described in the following specification particularly pointed out in the claims forming a part thereof, and illustrated in the accompanying drawings, in which Fig. 1 is an elevational section through a machine to which my invention is applied.

Fig. 2 is an enlarged section on the line 2—2 of Fig. 1.

Fig. 3 is an enlarged section on the line 3—3 of Fig. 2.

Fig. 4 is an enlarged section on the line 4—4 of Fig. 2, and

Fig. 5 is a side view of a socket wrench for locking and unlocking the container.

Figure 1:
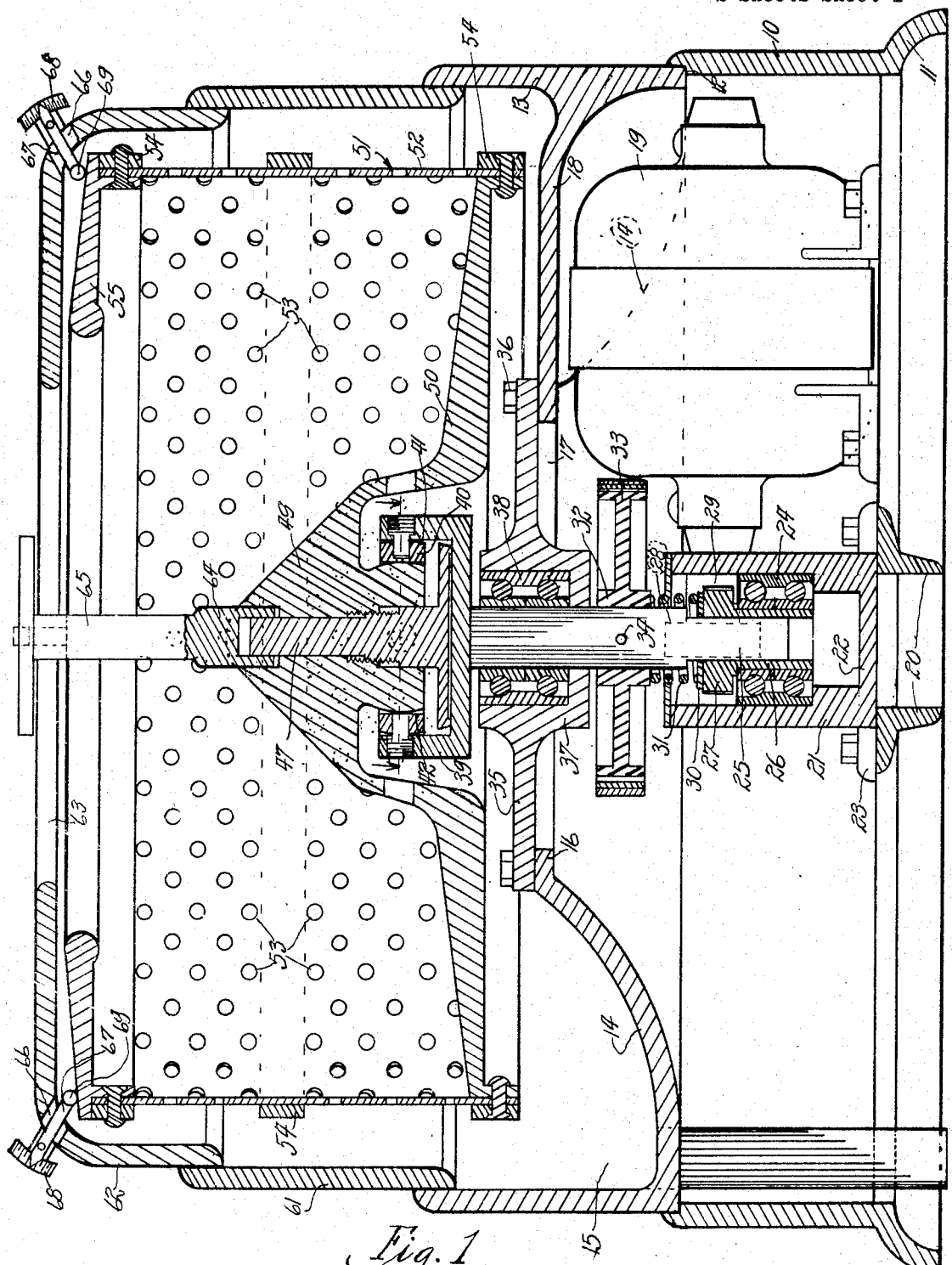

Referring to the drawings, the machine comprises an annular frame 10 provided with an integral base portion 11 and having a rabbet 12 to serve as a seat for an annular casing 13 which is formed with a partition 14 originating at the lower end of said casing and curved upwardly to provide an annular trough 15. The partition is formed with a horizontal central wall 16, having a large central opening 17 for purposes of assembly.

The trough 15 is also formed with a hood 18 to clear and protect a motor 19 from which motive power is derived. Ribs 20 extend across the base 11 and serve as a support for a gear box 21, whose bottom 22 is provided with feet 23 bolted to the ribs 20.

The gear box contains a radial and end thrust bearing 24, in which is journaled a shaft 25 whose lower end enters a sleeve 26, and has a rotating fit therewith. The sleeve 26 at its upper end is formed integral with a helical gear 27 meshing with a driving helical gear 28 fast on the shaft 29 of the motor 19 which is connected to a source of electrical current (not shown).

The gear 27 is superposed by a frictional bearing collar 30 keyed to the shaft 25 and having secured thereto the lower end of a compression spring 31 whose upper end is secured to the hub 32 of a brake wheel 33 fast on the shaft 25 by a cross pin 34.

The opening 17 in the wall 16 is closed by a bearing plate 35 held in place by a series of bolts 36 and having a central hub 37 to receive a radial bearing 38 in which is journaled the shaft 25 whose upper end is formed integral with a receiving cup 39 having in its interior a true cylindrical surface.

Interiorly of said cap is a ring 40 whose outer face 41 is arcuate to form the segment of a ball whose center coincides with the vertical axis of said cup. The inner face 42 of ring 40 is a true cylindrical surface. Screws 43 are inserted in aligning openings 44 and 45 (Fig. 2), respectively, provided in the cup wall and the ring 40.

A control disk 46 forms the lower end of a stem 47 which is of circular cross section and varying diameters. An intermediate portion of said stem is formed with threads 48 for a purpose hereinafter further explained.

The stem 47 is surrounded by a hub portion 49 of a bottom structure 50 of a container or receptacle 51 whose wall 52 is cylindrical and provided with a large number of perforations 53. The wall 52 is reinforced by a plurality of circumferential bands 54 secured thereto in any approved or desired manner. The wall 52 has a cover ring 55 through which articles to be dried are introduced.

The hub 49 has threads 56 engaging the threads 48 of the stem 47. The hub is further provided with a central ball bearing 57 whose center coincides with the vertical axis of the cup 39. The surface of the ball bearing is adapted to contact with the inner surface 42 of the ring 40. Screws 58 are introduced in threaded openings 59 in the ring 40 arranged at right angles to the openings 45 and extending into aligning openings 60 in the ball bearing 57.

It is evident that the container seated with its bearing 57 in the cup 39 may swing about the screws 43 as pivot and screws 58 as pivot, thus affording a cardanic support for the container.

The container is surrounded by a sectionalized casing comprising telescopically fitted rings 61 and 62. The ring 62 is constructed as a cover but having a large central opening 63 to enable the introduction of articles to be dried.

The hub 49 as its topmost part has a recess into which extends the upper end of the stem 47 which is formed with angular faces to fit in the socket 64 of a wrench 65 which is applied for a purpose presently described.

In use the wrench 65 is applied to the stem 47 preparatory to loading the container. The stem as shown in Fig. 1 is in locked position, as the disk 46 is in contact with the bottom of the cup and rigidly locks the rings 40 in true concentric relation with respect to the axis of the container and shaft.

Upon turning the stem 47 in counter clockwise direction the disk 46 is slightly disengaged from the cup bottom and engages the ring 40 and the ball bearing 57 to lock these parts against movement about the screws 58 but permitting movement about the screws 43. This adjustment is depicted in Fig. 3.

Upon further turning the stem in clockwise direction, however, the disk 46 becomes spaced from the ring 40 and the ball bearing 57 which enables the container to tilt about the axis defined respectively by the screws 43 and 58. This adjustment is depicted in Fig. 4. When the parts are in the position shown in Fig. 4 the container is loaded and any irregularity in the distribution of the load is registered by a tilting of the container. The operator can then correct this defect by adding a load at the opposite point or rearrange the distribution until the container substantially occupies a true balanced position.

The degree of tilting of the container can be registered by a device hereinafter described.

Upon the container assuming a balanced position the stem 47 is further rotated clockwise until the disk 46 contacts with the bottom of the cup 39 as shown in Fig. 1 in which position the container is in balanced condition and locked in such condition so that upon rotation of the container no vibration can possibly occur.

Attention is called to the fact that irrespective of any tilting of the container all the parts of the device are continuously maintained in true concentric relation by reason of the fact that the ring 40 engages with a ball surface the inner cylindrical face of the cup 39 and the hub 57 similarly engages with a ball surface the inner cylindrical face of the ring 40.

It is also noteworthy that by reason of the construction of the cardanic support the assembly of the machine is possible in true concentric arrangement precluding the necessity of adjustments and also precluding the necessity of employing weights which were hitherto employed for balancing the container.

The construction of a ball surface in engagement with a cylindrical surface entails the advantage that at no time can dirt or foreign substances enter the space between said surfaces.

In order to apprize the operator of any unequal distribution of a load, a plurality of indicating and weighing means 66 are provided. As shown in Fig. 1 the cover ring 62 is provided with a plurality of slots 66 through which extends a weighted pointer 67 playing over a scale 68 supported on the ring 62. The weighted end 69 bears on the container ring 55 so that upon tilting of the container at any point by reason of the unequally distributed load the pointer indicates the total weight and also extent of the unequal weight by comparison with the pointers at other points of the container.

While the drawing shows a preferred embodiment of the invention, the same is merely illustrated by way of explanation and not by way of limitation.

Innumerable changes, alteration, and revisions may be made within the purview of the invention.

I, therefore, do not limit myself to the details of construction or arrangement of parts as shown, but claim my invention as broadly as the state of the art permits.

I claim:

1. In a device of the character described, a rotatable container, means for supporting said container for tilting about two horizontal axes at right angles to one another, and means for permitting tilting of said container about one axis, and locking said container against tilting about the other axis.

2. In a device of the character described, a rotatably mounted container, means for supporting said container for tilting about two horizontal axes at right angles to one another, and means for locking said container against tilting about one or both of said axes.

3. In a device of the character described, a container, a shaft supporting said container for rotation, a joint comprising cooperative members interposed between said container and said shaft permitting said container to tilt about two horizontal axes at right angles to one another, said joint members being constructed to maintain concentric relation with each other throughout tilting of said container and means for locking said container against tilting about one or both of said axes.

4. In a device of the character described, a container, a shaft supporting said container for rotation, a joint comprising cooperative members interposed between said container and said shaft permitting said container to tilt about two horizontal axes at right angles to one another, said joint members being constructed to maintain concentric relation with each other throughout tilting of said container, and means for locking said container against tilting about one or both axes.

5. In a device of the character described, a container, a shaft supporting said container for rotation, a joint comprising cooperative members having arcuate contact walls and interposed between said shaft and said container, said joint permitting said container to tilt about two horizontal axes at right angles to one another and means for locking said container against tilting about one or both of said axes.

6. In a device of the character described, a container, a shaft supporting said container for rotation, a joint comprising cooperative members having arcuate contact walls and interposed between said shaft and said container, said joint permitting said container to tilt about two horizontal axes at right angles to one another and adjustable means for locking said container about one or both of said axes, adjustable means for re-establishing concentrical relation between said shaft and said joint members after tilting when locked about both axes.

7. In a device of the character described, a rotatably mounted container for receiving a load, means for supporting said container for tilting about two horizontal axes at right angles to one another, means for locking said container against tilting about one or both of said axes, and means for positively indicating the amount of uneven distribution of the load in said container while the latter is locked about one of said axis.

CHARLES CALVERT LAMB.